(12) United States Patent
Gibson

(10) Patent No.: US 11,669,140 B2
(45) Date of Patent: *Jun. 6, 2023

(54) TECHNIQUES FOR MONITORING POWER DEVICE ALARMS

(71) Applicant: Capital One Services, LLC, McLean, VA (US)

(72) Inventor: Dennis Gibson, Powhatan, VA (US)

(73) Assignee: Capital One Services, LLC, McLean, VA (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/934,465

(22) Filed: Jul. 21, 2020

(65) Prior Publication Data
US 2021/0200290 A1  Jul. 1, 2021

Related U.S. Application Data

(63) Continuation of application No. 16/728,468, filed on Dec. 27, 2019, now Pat. No. 10,754,406.

(51) Int. Cl.
*G06F 1/00* (2006.01)
*G06F 1/30* (2006.01)
*G06F 1/32* (2019.01)
*G04G 13/02* (2006.01)

(52) U.S. Cl.
CPC .................. *G06F 1/30* (2013.01); *G06F 1/32* (2013.01); *G04G 13/026* (2013.01)

(58) Field of Classification Search
CPC ........................................ G06F 1/30; G06F 1/32
See application file for complete search history.

(56) References Cited

U.S. PATENT DOCUMENTS

| | | | | |
|---|---|---|---|---|
| 5,087,908 | A * | 2/1992 | Sanders, Jr. ........... | G08B 13/19 340/567 |
| 5,638,421 | A * | 6/1997 | Serrano ................. | H04M 19/04 379/372 |
| 2004/0032947 | A1* | 2/2004 | Nattkemper ........ | H04M 19/001 379/413 |
| 2004/0078508 | A1* | 4/2004 | Rivard ................ | G06F 12/0866 711/E12.019 |
| 2006/0082322 | A1* | 4/2006 | Morishita .............. | H05B 45/54 315/200 A |
| 2009/0222241 | A1* | 9/2009 | Dorogi .................... | G01R 31/44 702/182 |
| 2010/0292544 | A1* | 11/2010 | Sherman .................. | A61B 5/00 128/204.23 |
| 2014/0025211 | A1* | 1/2014 | Cheim .............. | H02J 13/00002 700/286 |
| 2015/0057825 | A1* | 2/2015 | Steele ....................... | H02J 4/00 700/297 |

* cited by examiner

*Primary Examiner* — Mohammed H Rehman

(57) ABSTRACT

Techniques and apparatus for providing power monitoring processes are described. In one embodiment, for example, an apparatus may include at least one storage device and logic coupled to the at least one storage device. The logic may be configured to poll a power device comprising a plurality of power elements via an alarm status identifier operative to cause the power device to return an alarm status string comprising a plurality of alarm status bits, each of the plurality of alarm status bits indicating an active alarm state of one of the plurality of power elements, and determine each of the plurality of power elements in the active alarm state based on the alarm status string. Other embodiments are described.

20 Claims, 6 Drawing Sheets

TECHNIQUES FOR MONITORING POWER DEVICE ALARMS

RELATED APPLICATIONS

This application is a continuation of U.S. patent application Ser. No. 16/728,468, entitled "TECHNIQUES FOR MONITORING POWER DEVICE ALARMS" filed on Dec. 27, 2019. The contents of the aforementioned application are incorporated herein by reference.

TECHNICAL FIELD

Embodiments herein generally relate to managing power devices in a network, more particularly, to processes for monitoring power device alarms based on object identifier information.

BACKGROUND

Computing infrastructure for enterprise-level projects, such as implementing a commercial website or a data center, requires a corresponding electrical framework of power devices to support the electrical needs of each system. For example, cabinet or rack-mounted power distribution units (PDUs) may be used to supply power to racks of computers and/or networking equipment. PDUs may have management features that allow operators to remotely manage the devices and monitor for alarms, such as high voltage conditions, high temperature conditions, and/or the like. For example, PDU developers may provide a user interface platform that allows operators to view the status of PDUs. In conventional systems, PDU developers typically charge a fee for each monitoring or polling point. A typical enterprise solution may have multiple racks of PDUs, with each PDU having a plurality of outlets (for example, about 10-32 outlets each). Accordingly, the cost to monitor for each type of alarm for each outlet of a PDU in an entire system may escalate to a high-cost management fee for the system.

DETAILED DESCRIPTION

Figure 1:
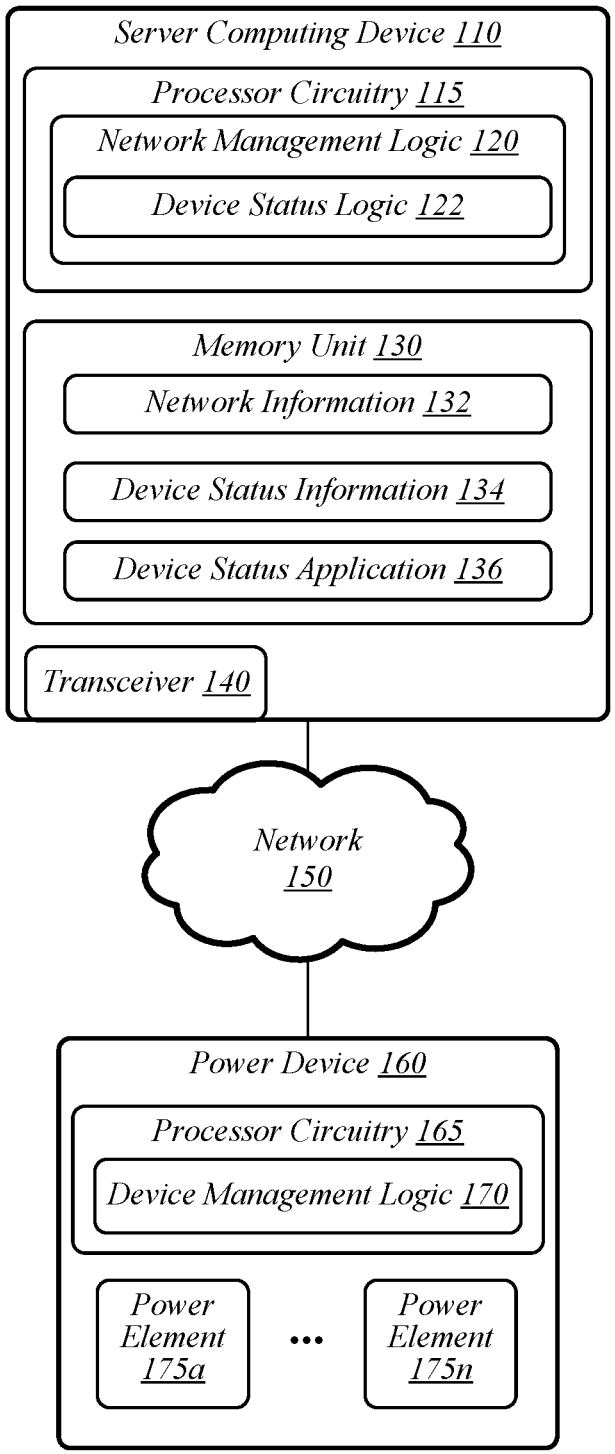
FIG. 1 illustrates an embodiment of a first operating environment.

Various embodiments may generally be directed toward systems, methods, and/or apparatus for implementing a power device alarm monitoring process. In some embodiments, a power monitor computing device may poll power device that each include multiple power elements. In various embodiments, a power device may include a power distribution unit (PDU), such as a cabinet or rack-mounted PDU. Each PDU may include multiple outlet power elements that may be connected to devices to supply power to the devices. In some embodiments, PDUs may be configured to communicate over a network with power monitor computing device. A non-limiting example of a network communication platform for power devices may include a simple network management protocol (SNMP) or similar protocol used to collect and manage information for power devices over a network.

In some embodiments, the power monitoring computing device may poll a power device using an alarm status identifier. The alarm status identifier may be configured to cause the power device to return alarm status information. In exemplary embodiments, the alarm status identifier may be an object identifier (OID). In general, an OID may include an information element used to identify an object that has been formalized by an organization, such as a developer or standards organization. For example, an OID may be or may include an OID protocol according to International Telecommunications Union ITU-T recommendation X.208 (ASN.1), International Organization for Standardization ISO/IEC 8824:1994, variations thereof, versions thereof, combinations thereof, and/or the like.

The alarm status information may include a single data element capable of conveying an alarm status for a plurality of power elements. For example, alarm status information may include a string of bits, with each power element being represented in the string of bits (for instance, bit 1 (or bit 0) may represent power element 1 (or power outlet 1), bit 2 (or bit 1) may represent power element 2, and so on). Accordingly, the power monitoring computing device may determine whether a power element is in an alarm state based on the value of the corresponding bit in the alarm status information. For example, bits set to a value of 1 may be in an alarm state (or vice versa). In some embodiments, the alarm status information may be a value, such as an integer, that may be parsed or otherwise processed to generate a string of bits. In some embodiments, for example, the alarm status OID may be a low current OID and the alarm information may include an alarm status string of alarm bits (or a value that can be processed into a string of bits), with each bit indicating that a corresponding power element is in a low current state.

In order to limit alarming information, false alarms, and/or the like, power devices and/or elements thereof may be enrolled (or enabled). For example, power monitoring computing device may poll for a power status of power elements that have been indicated as being connected to a device. A non-limiting example of a power status may be a current amperage. Each power element that returns an amperage over a threshold amount may be enrolled by having a power alarm enabled. The power alarm may be an alarm that may be monitored according to power device monitoring processes of some embodiments. For example, the power alarm may be a low current power alarm. In some embodiments, the low power alarm may be enabled by setting the alarm value to a non-zero minimum value, such as 0.1 amps.

For an enabled power element, in which it has been indicated that a device was connected and that the amperage was detected over a minimum threshold, the low current alarm may indicate that the power element has malfunctioned or that a device has become unplugged. Accordingly, some embodiments may operate to provide an early indication of a failed power device/element and/or an unplugged device. Accordingly, embodiments may use a single low power alarm status to determine whether there is a low current alarm on a power element of a power device. In various embodiments, if there is a low current alarm, the corresponding alarm information may be analyzed to determine which outlet is the source of the alarm.

Power device monitoring processes according to some embodiments may provide multiple technological advantages, including improvements to computing technology, over conventional systems and methods. One non-limiting example of a technological advantage is the ability to monitor a plurality of power elements using a vastly decreased number of polling points, including a single polling point (for instance, a low current alarm). Power device vendors may provide management software and/or services for enterprise users. Such services are typically charged or licensed per polling point. A polling point may be a single power element and/or a single alarm for a power element. For example, a first polling point may be a temperature alarm for an outlet, a second polling point may be a low current alarm for an outlet, a third polling point may be a current amperage for an outlet. Accordingly, for enterprise-level power infrastructure, conventional monitoring techniques may require a large number of polling points. For example, for two power cabinets, each with two PDUs with 32 outlets, 4×32=128 polling points (assuming only 1 polling point per outlet) may be required. Accordingly, the cost to monitor the power infrastructure may be expensive. In addition, polling for each individual point and processing the information using conventional systems increases network traffic and consume valuable computing resources. For example, each PDU with 32 outlets is required to respond to 32 different OID request per polling cycle. However, power device monitoring processes according to some embodiments may only require 4 polling points to monitor a low current alarm for 4×32=128 outlets, one for each power device, to monitor for a failed power device/element and/or an unplugged device.

Accordingly, power device monitoring according to some embodiments may allow operators to monitor their power infrastructure at vastly less cost while requiring reduced network and computing resources compared with conventional systems. For example, license costs per PDU may be reduced, for instance, from 32 points per PDU to 1 point per PDU. In another example, network bandwidth usage may be reduced due to polling only 1 point per PDU. In a further example, a faster polling loop may be achieved as a polling function may hit all OIDs, updating the database each response in a shorter time frame. Furthermore, reduced CPU resources may be consumed on both the polling device (i.e., power monitoring computing device) and the polled devices.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include computing device ("server computing device" or "power monitoring computing device") 110 communicatively coupled to power devices 160a-n, for example, via network 150. In some embodiments, computing device 110 and/or computing devices 160a-n may be or may include a stand-alone computing device, such as a personal computer (PC), server, tablet computing device, cloud computing device, mobile computing device (for instance, a smart phone, tablet computing device, and/or the like), data appliance, and/or the like. In some embodiments, computing device 110 may include a plurality of computing devices and/or computing systems (for instance, data centers, cloud computing environments, computing clusters, and/or the like).

Although only one computing device 110 is depicted in FIG. 1, embodiments are not so limited. In various embodiments, the functions, operations, configurations, data storage functions, applications, logic, and/or the like described with respect to computing device 110 may be performed by and/or stored in one or more other computing devices. A single computing device 110 is depicted for illustrative purposes only to simplify the figure.

As shown in FIG. 1, computing device 110 may include processor circuitry 115, a memory unit 130, and a transceiver 140. Processor circuitry 115 may be communicatively coupled to memory unit 130 and/or transceiver 140.

Processor circuitry 115 may include and/or may access various logic for performing processes according to some embodiments. For instance, processor circuitry 115 may include and/or may access device status logic 122. Processing circuitry 115, device status logic 122, and/or portions thereof, may be implemented in hardware, software, or a combination thereof. As used in this application, the terms "logic, "component," "layer," "system," "circuitry," "decoder," "encoder," and/or "module" are intended to refer to a computer-related entity, either hardware, a combination of hardware and software, software, or software in execution, examples of which are provided by the exemplary computing architecture 800. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chipsets, software components, programs, applications, firmware, software modules, computer code, combinations of any of the foregoing, and/or the like.

In some embodiments, device status logic 122 may operate to monitor the status of power device 160. Although device status logic 122 is depicted in FIG. 1 as being within processor circuitry 115, embodiments are not so limited. In some embodiments, device status logic 122 may be resident in processor circuitry 115 as code or other executable instructions of device status application 136.

Memory unit 130 may include various types of computer-readable storage media and/or systems in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In addition, memory unit 130 may include various types of computer-readable storage media in the form of one or more lower speed memory units, including an internal (or external) hard disk drive (HDD), a magnetic floppy disk drive (FDD), and an optical disk drive to read from or write to a removable optical disk (e.g., a CD-ROM or DVD), a solid state drive (SSD), and/or the like.

Power device 160 may include a monitored device operating within a power infrastructure, such as a PDU, remote power panel (RPP), or other power distribution hardware. In some embodiments, power device 160 may be a PDU. In various embodiments, power device 160 may be an eConnect® PDU provided by Chatsworth Products of Agoura Hills, Calif., United States. In such embodiments, device management logic 170, device status logic 122, and/or device status application 136 may be, may include, and/or may be configured to operate with FieldView, Nlyte, or other compatible DCIM management software.

In various embodiments, power device 160 may include one or more power elements 175a-n. A non-limiting example of a power element may include a power outlet. Power device 160 may include processor circuitry 165 and device management logic 170. In some embodiments, device management logic 170 may be vendor-provided logic installed on the device at or near the time of manufacture. In various embodiments, device management logic 170 (alone or via device status application) may be configured to operate using OID standards. For example, device status application 136 may poll for an OID and device management logic 170 may return a corresponding value. In some embodiments, device management logic 170 may be modified by an operator at the operator site. For example, an operator may define OIDs, OID values, alarm parameters, enabled/disabled alarms, and/or the like. In some embodiments, the OIDs may be implemented or transmitted over a SNMP protocol.

Memory unit 130 of computing device 110 may store a device status application 136 that may operate, alone or in combination with device status logic 122, to perform various functions according to some embodiments. For example, device status application 136 may be or may include an application operative to perform power device monitoring processes according to some embodiments. Memory unit 130 may store various information, such as network information 132 and/or device status information 134. In some embodiments, network information 132 may include network information associated with various network elements of network 150. In some embodiments, network information 132 may include a management information base (MIB) for management via OIDS according to some embodiments. An MIB may include identifiers for power elements 175a-n, alarm types, alarm parameters, and/or any other type of information required for SNMP and/or OID functions according to some embodiments. Device status information 134 may include information associated with devices and elements thereof. In some embodiments, device status information 134 may include alarm limits, enabled/disabled alarms, active alarms, and/or the like for power device 160 and/or power elements 175a-n thereof.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation. Blocks designated with dotted lines may be optional blocks of a logic flow.

A logic flow may be implemented in software, firmware, hardware, or any combination thereof. In software and firmware embodiments, a logic flow may be implemented by executable computer instructions stored on a non-transitory computer readable medium or machine-readable medium, such as an optical, magnetic or semiconductor storage. The embodiments are not limited in this context.

Figure 2:
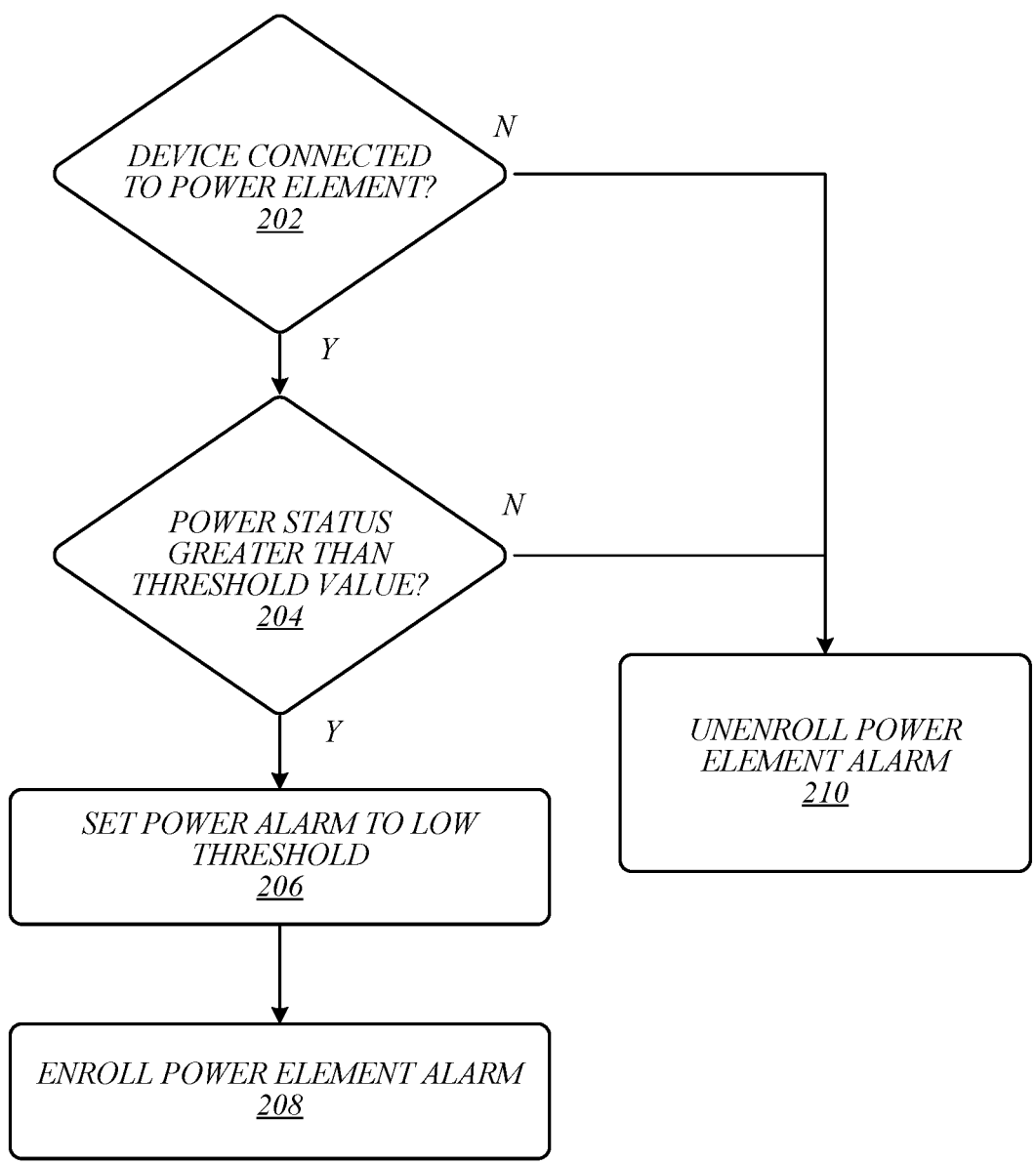
FIG. 2 illustrates an embodiment of a first logic flow.

FIG. 2 illustrates an embodiment of a logic flow 200. Logic flow 200 may be representative of some or all of the operations executed by one or more embodiments described herein, such as computing device 110. In some embodiments, logic flow 200 may be representative of some or all of the operations of an enrollment process associated with a power monitoring process according to some embodiments.

At block 202, logic flow 200 may determine whether a device is connected to the power element. For example, a power monitoring computing device (for instance, computing device 110) may determine whether a power consuming device (for instance, a computer, network device, and/or the like) is plugged into each outlet of a PDU. Logic flow 200 may determine whether a power status of the power elements is greater than a threshold value at block 204. For example, the computing device may determine whether a current greater than a threshold value, such as 0.75 amps. For example, the computing device may send an OID (such as 1.3.6.1.4.1.30932.1.1.2.31.31.0 for an eConnect® PDU) for each outlet to determine the current for the outlet. If a device has previously been connected (block 202) and the current is over the threshold value (block 204), logic flow 200 may enroll or enable alarming for the outlet. Accordingly, enabling alarms may allow the user to turn on outlet level monitoring for all outlets on all PDUs that have a load greater than 0.75 Amps that are indicated as being connected to a power consuming device.

For enabled alarms, a power alarm may be set to a low threshold by logic flow 200 at block 206. For example, a low current alarm threshold may be set to 0.1 amps. Accordingly, if the amperage of the outlet goes below 0.1 amps, the low current alarm may be activated.

In some embodiments, logic flow 200 may enroll the power element alarm at block 208. If a device is not connected (block 202) to the outlet and/or the current is not over the threshold value (block 204), then logic flow may unenroll/disable the power element alarm at block 210. Accordingly, the computing device only has to monitor for enabled alarms.

Figure 3:
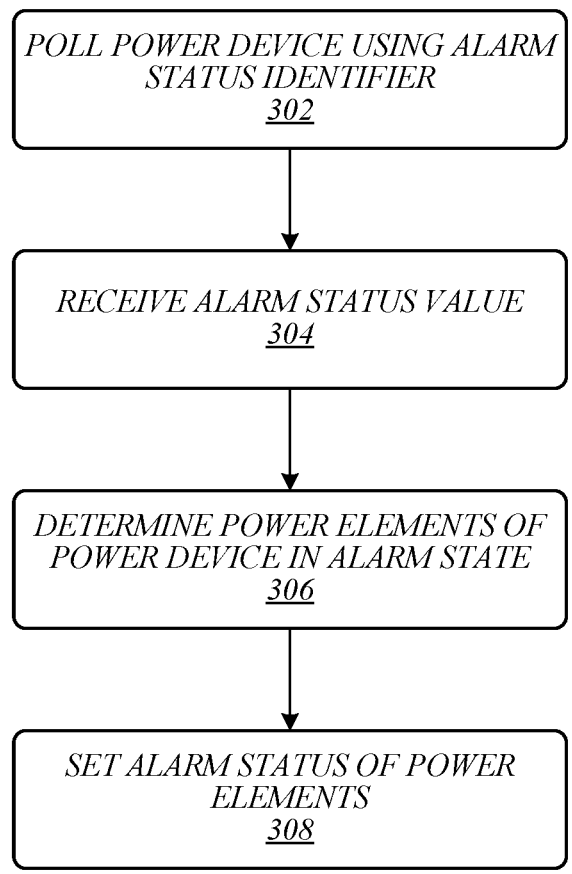
FIG. 3 illustrates an embodiment of a second logic flow.
Figure 4:
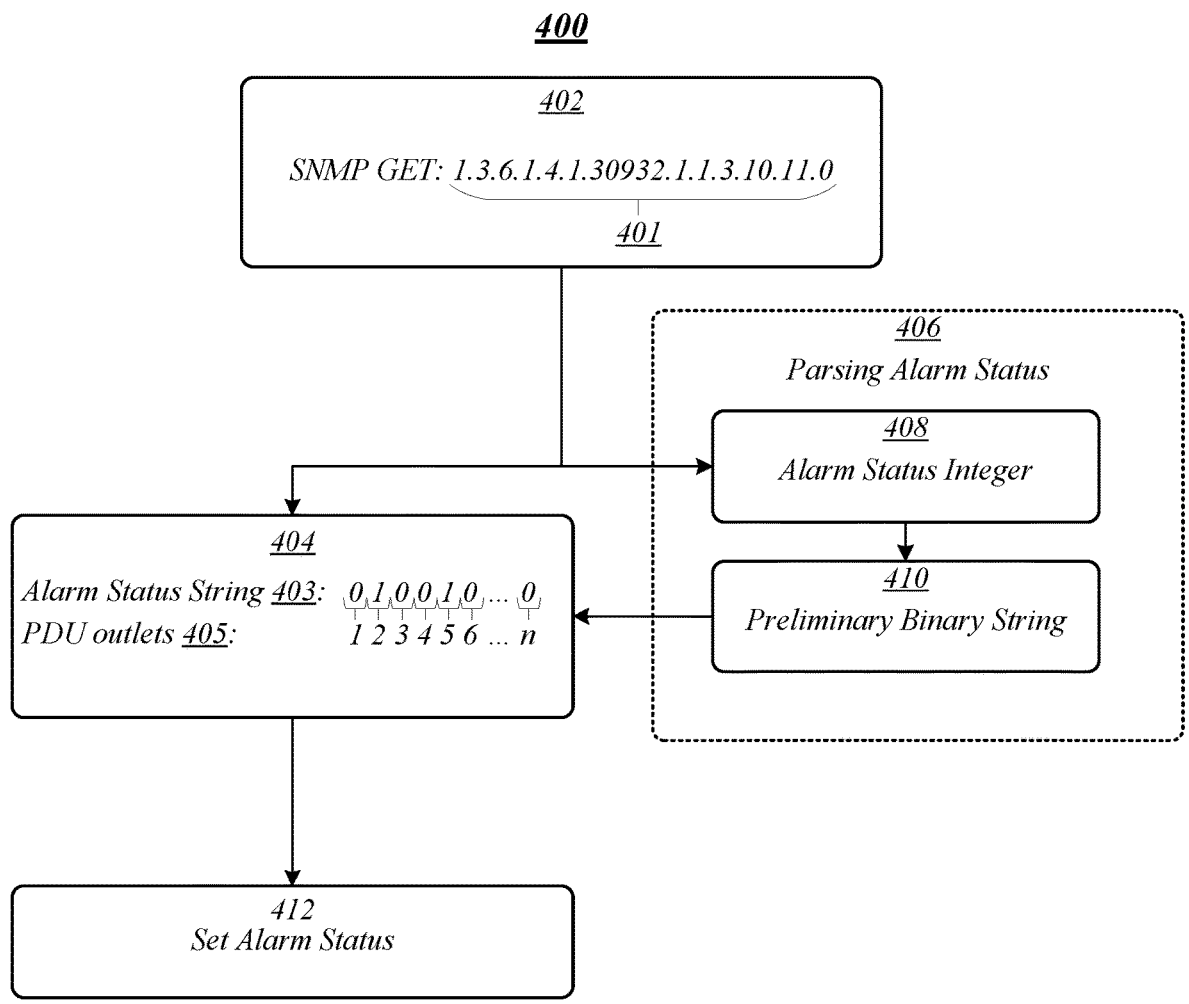
FIG. 4 illustrates an embodiment of a third logic flow.

FIG. 3 illustrates an embodiment of a logic flow 300. FIG. 4 illustrates an embodiment of a logic flow 400 that corresponds to certain of the operations of logic flow 300. Logic flows 300 and 400 may be representative of some or all of the operations executed by one or more embodiments described herein, such as computing device 110. In some embodiments, logic flows 300 and 400 may be representative of some or all of the operations of a power monitoring process according to some embodiments.

At block 302, Logic flow 300 may poll a power device using an alarm status identifier. For example, in an embodiments with an eConnect® PDU, the eConnect® profile (for instance, in a corresponding MIB) in FieldView or other management application may contain a function named "Low Outlet Current." This function may be set to poll a particular alarm status OID, such as 1.3.6.1.4.1.30932.1.1.3.10.11.0 which contains a "Warning Low Current" alarm status for the outlets of PDU (for example, outlets 1-32). In some embodiments, the alarm status OID may hold all alarm statuses. The normal state for this OID may be set to 0, however, in some embodiments it may be configured to hold a binary representation of the outlets with an active alarm. In various embodiments, the binary representation may include 32 bits. In some embodiments, the binary representation may include a number of bits corresponding to a number of outlets of PDU. In various embodiments, if the number of outlets exceeds the number of allowed bits (for example, 36 outlets for a 32-bit string), then multiple alarm status OIDs may be used, with the outlets split across the multiple alarm status OIDs (for example, outlets 1-30 on a first alarm status OID and outlets 31-36 on a second alarm status OID). Referring to FIG. 4, logic flow 400 may send an alarm status OID 401 to a PDU at block 402. In some embodiments, alarm status OID 401 may be a low current OID operative to indicate whether a low current alarm is active for one or more power elements of a power device.

Logic flow 300 may receive an alarm status value at block 304. For example, a polled PDU may return alarm information in the form of a string or numerical value that corresponds to the alarm status of the polled PDU. Referring to FIG. 4, logic flow 400 may receive an alarm status string 403 that has bits corresponding to power elements 405.

Alternatively, logic flow 400 may be required to parse the alarm status at block 406 to determine the bits for each PDU outlet. For example, logic flow 400 may receive or otherwise access a low current OID value stored as an alarm status integer 408 in response to block 402. For example, when a low current alarm is triggered logic flow 400 may parse the OID return value (for instance, a 32-bit string or integer) to identify which of the 32 outlets was in alarm. Logic flow 400 may convert the alarm status integer 408 to a preliminary binary string 410 using known processes at block 406. The preliminary binary string may be padded with leading zeroes to reach a required length (for example, 32 bits for a 32-bit alarm status string) by logic flow 400 at block 406 to generate the alarm status string 403.

At block 306, logic flow 300 may determine power elements of the power device in an alarm state. For example, referring to FIG. 4, each bit of alarm status string 403 may represent an outlet 405. The value of the bits may correspond to the alarm state for the corresponding outlet 405. For example, a "0" bit may indicate no alarm (i.e., no low current alarm is active at the outlet) and a "1" bit may indicate and alarm, or vice versa. Accordingly, logic flow 400 may set the alarm status of each outlet according to the alarm status string 403 at block 412. For example, outlet 1 has a corresponding bit value of "0" indicating no alarm, while outlet 2 has a bit value of "1" indicating a low current alarm, indicating an outlet malfunction and/or an unplugged device.

At block 308, logic flow 300 may set the alarm status of the power elements according to the alarm status bits. If a power element is in an alarm state, a corresponding indicator or message may be transmitted or made visible. For example, a user interface corresponding to power monitoring of the power device may include a graphical user interface (GUI) object indicating that a power element is in an alarm state. In another example, an email, text message, or other signal may be transmitted indicating that a power element is in an alarm state. Embodiments are not limited to this context.

Figure 5:
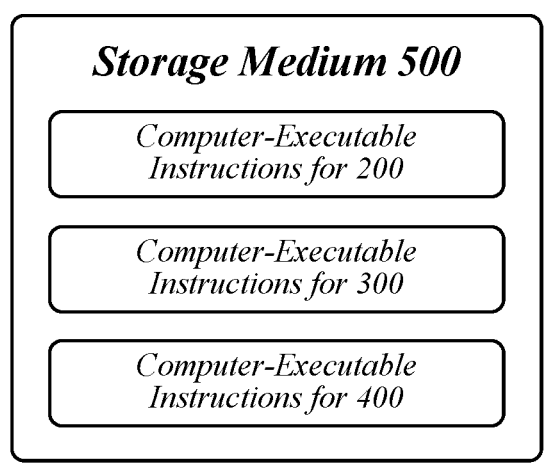
FIG. 5 illustrates an embodiment of a storage device.

FIG. 5 illustrates a storage medium 500. Storage medium 500 may represent an implementation of a storage device of any electronic device and/or computing device that may operate as computing device 110. The storage medium 500 can comprise any non-transitory computer-readable storage medium or machine-readable storage medium. In various embodiments, the storage medium 500 can comprise a physical article of manufacture. In various embodiments, storage medium 500 can store computer-executable instructions, such as computer-executable instructions to implement one or more of logic flows or operations described herein, such as logic flow 200, logic flow 300, and/or logic flow 400. In various embodiments, storage medium 500 can store computer-executable instructions, such as computer-executable instructions to implement any of the functionality described herein in relation to any described device, system, or apparatus. Examples of a computer-readable storage medium or machine-readable storage medium can include any tangible media capable of storing electronic data. Examples of computer-executable instructions can include any type of computer readable code.

Figure 6:
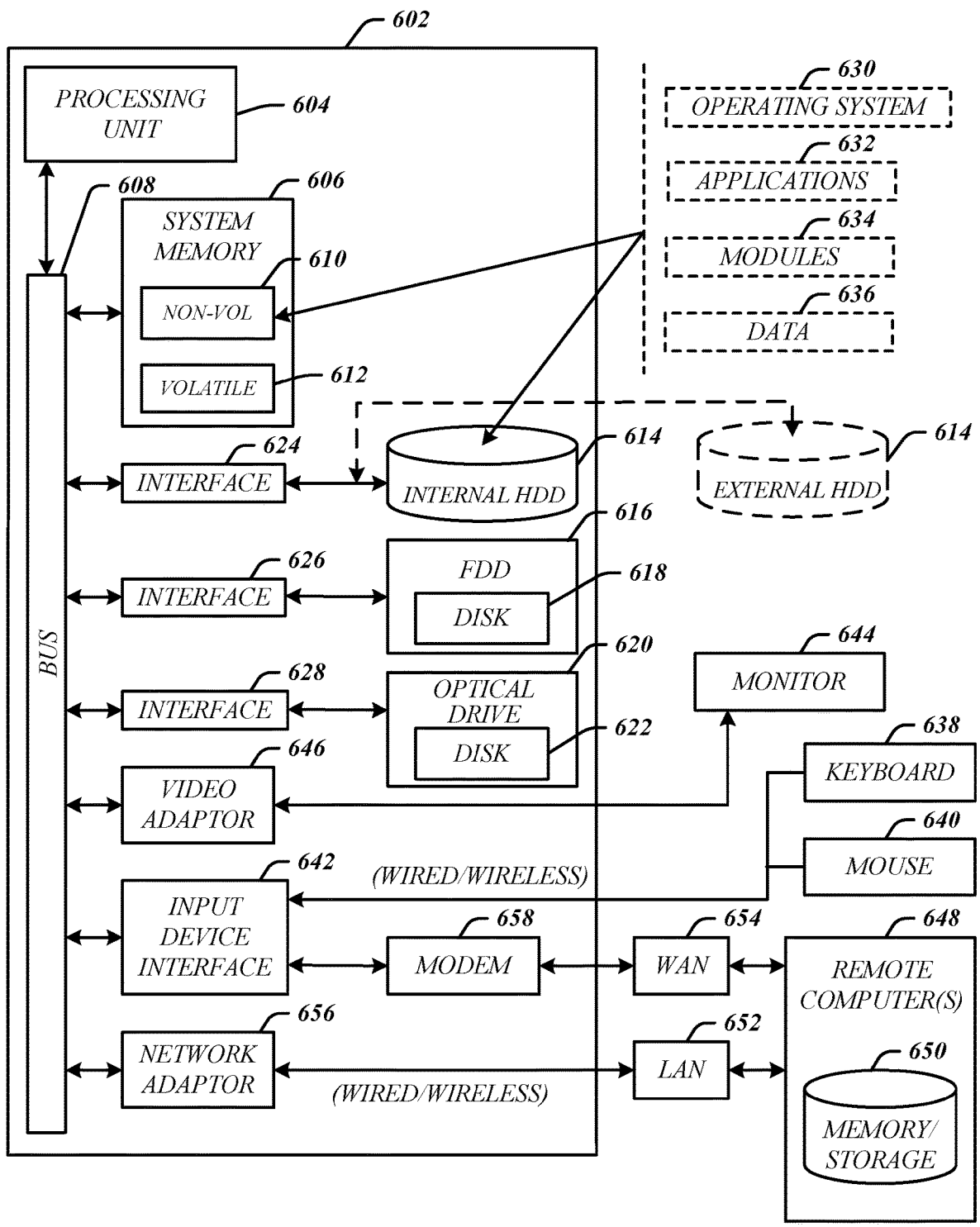
FIG. 6 illustrates an embodiment of a computing architecture.

FIG. 6 illustrates a computing architecture 600 that can implement various embodiments described herein. In various embodiments, the computing architecture 600 can comprise or be implemented as part of an electronic device and/or a computing device. In various embodiments, the computing architecture 600 can represent an implementation of any constituent component of computing device 110. One or more of the constituent components of the computing architecture 600, and/or any constituent component of computing device 110, can be implemented in hardware, software, or any combination thereof including implementation based on a storage device (e.g., a memory unit) and logic, at least a portion of which is implemented in circuitry and coupled to the storage device. The logic can be or can include a processor or controller component.

The computing architecture 600 can include various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth.

As shown in FIG. 6, the computing architecture 600 can comprise a computer 602 having a processing unit 604, a system memory 606 and a system bus 608. The processing unit 604 can be any of various commercially available processors or can be a specially designed processor.

The system bus 608 provides an interface for system components including, but not limited to, an interface between the system memory 606 and the processing unit 604. The system bus 608 can be any of several types of bus structure that may further interconnect to a memory bus (with or without a memory controller), a peripheral bus, and a local bus using any of a variety of commercially available bus architectures. The system memory 606 can include any type of computer-readable storage media including any type of volatile and non-volatile memory. The computer 602 can include any type of computer-readable storage media including an internal (or external) hard disk drive (HDD) 614. In various embodiments, the computer 602 can include any other type of disk drive such as, for example, a magnetic floppy disk and/or an optical disk drive. The HDD 614 can be connected to the system bus 608 by a HDD interface 624. In various embodiments, any number of program modules can be stored in the drives and memory units 606 and/or 614 such as, for example, an operating system 630, one or more application programs 632, other program modules 634, and program data 636.

A user can enter commands and information into the computer 602 through one or more wired/wireless input devices such as, for example, a keyboard 638 and a pointing device, such as a mouse 640. These and other input devices can be connected to the processing unit 604 through an input device interface 642 that is coupled to the system bus 608. A monitor 644 or other type of display device can also be connected to the system bus 608 via an interface, such as a video adaptor 646. The monitor 644 may be internal or external to the computer 602.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a smartphone, a tablet, a peer device or other common network node, and typically includes many or all of the elements described relative to the computer 602. The logical connections depicted include wired and/or wireless connectivity to networks 652 such as, for example, a local area network (LAN) and/or larger networks, for example, a wide area network (WAN). Networks 652 can provide connectivity to a global communications network such as, for example, the Internet. A network adapter 656 can facilitate wired and/or wireless communications to the networks 652. The computer 602 is operable to communicate over any known wired or wireless communication technology, standard, or protocol according to any known computer networking technology, standard, or protocol.

The following include non-limiting example embodiments:

Example 1 may include an apparatus, comprising a storage device, and logic, at least a portion of the logic implemented in circuitry coupled to the storage device, the logic to poll, using a simple network management protocol (SNMP), a power device comprising a plurality of power elements via an alarm status identifier, the alarm status identifier comprising an alarm status object identifier (OID) operative to cause the power device to return an alarm status string comprising a plurality of alarm status bits, each of the plurality of alarm status bits indicating an active alarm state of one of the plurality of power elements, and determine each of the plurality of power elements in the active alarm state based on the alarm status string by accessing each of the plurality of alarm status bits in the alarm status string, and setting an alarm status associated with one of the plurality of power elements to the active alarm status responsive to a corresponding one of the plurality of bits having an alarm value.

Example 2 may include the apparatus of Example 1, the power device comprising a power distribution unit (PDU) and the plurality of power elements comprising a plurality of outlets of the PDU.

Example 3 may include the apparatus of Example 2, the alarm status OID comprising a low current OID, the alarm status string comprising a plurality of alarm status bits indicating each of the plurality of outlets in a low current state.

Example 4 may include the apparatus of Example 2, the plurality of power outlets comprising at least one enrolled outlet, the at least one enrolled outlet comprising an outlet determined to have a previously-connected device.

Example 5 may include the apparatus of Example 4, the logic to determine the at least one enrolled outlet via polling the PDU using a current amperage OID operative to cause the PDU to return an amperage value for the at least one outlet, and defining the at least one outlet as an enrolled outlet responsive to the amperage for the at least one outlet being greater than or equal to an amperage threshold.

Example 6 may include the apparatus of Example 5, the logic to enable active alarming for the at least one enrolled outlet via setting an alarm threshold to a minimum value.

Example 7 may include the apparatus of Example 1, the logic to parse the alarm status string for determining each of the plurality of power elements in the active alarm state by converting the alarm status string to an alarm status integer, converting the alarm status integer to an alarm status binary string, and padding the alarm status binary string until an alarm status binary string length equals the number of the plurality of power elements, each of a plurality of bits in the alarm status binary string associated with one of the plurality of power elements.

Example 8 is a computer-implemented method, comprising, via a processor of a computing device polling, using a simple network management protocol (SNMP), a power device comprising a plurality of power elements via an alarm status identifier, the alarm status identifier comprising an alarm status object identifier (OID) operative to cause the power device to return an alarm status string comprising a plurality of alarm status bits, each of the plurality of alarm status bits indicating an active alarm state of one of the plurality of power elements, and determining each of the plurality of power elements in the active alarm state based on the alarm status string by accessing each of the plurality of alarm status bits in the alarm status string, and setting an alarm status associated with one of the plurality of power elements to the active alarm status responsive to a corresponding one of the plurality of bits having an alarm value.

Example 9 may include the computer-implemented method of Example 8, the power device comprising a power distribution unit (PDU) and the plurality of power elements comprising a plurality of outlets of the PDU.

Example 10 may include the computer-implemented method of Example 9, the alarm status OID comprising a low current OID, the alarm status string comprising a plurality of alarm status bits indicating each of the plurality of outlets in a low current state.

Example 11 may include the computer-implemented method of Example 9, the plurality of power outlets comprising at least one enrolled outlet, the at least one enrolled outlet comprising an outlet determined to have a previously-connected device.

Example 12 may include the computer-implemented method of Example 11, comprising determining the at least one enrolled outlet via polling the PDU using a current amperage OID operative to cause the PDU to return an amperage value for the at least one outlet, and defining the at least one outlet as an enrolled outlet responsive to the amperage for the at least one outlet being greater than or equal to an amperage threshold.

Example 13 may include the computer-implemented method of Example 12, comprising enabling active alarming for the at least one enrolled outlet via setting an alarm threshold to a minimum value.

Example 14 may include the computer-implemented method of Example 8, comprising parsing the alarm status string for determining each of the plurality of power elements in the active alarm state by converting the alarm status string to an alarm status integer, converting the alarm status integer to an alarm status binary string, and padding the alarm status binary string until an alarm status binary string length equals the number of the plurality of power elements, each of a plurality of bits in the alarm status binary string associated with one of the plurality of power elements.

Example 15 includes at least one non-transitory computer-readable medium comprising a set of instructions that, in response to being executed via a processing unit of a computing device, cause the computing device to poll, using a simple network management protocol (SNMP), a power device comprising a plurality of power elements via an alarm status identifier, the alarm status identifier comprising an alarm status object identifier (OID) operative to cause the power device to return an alarm status string comprising a plurality of alarm status bits, each of the plurality of alarm status bits indicating an active alarm state of one of the plurality of power elements, and determine each of the plurality of power elements in the active alarm state based on the alarm status string by accessing each of the plurality of alarm status bits in the alarm status string, and setting an alarm status associated with one of the plurality of power elements to the active alarm status responsive to a corresponding one of the plurality of bits having an alarm value.

Example 16 may include the at least one non-transitory computer-readable medium of Example 1, the power device comprising a power distribution unit (PDU) and the plurality of power elements comprising a plurality of outlets of the PDU.

Example 17 may include the at least one non-transitory computer-readable medium of Example 2, the alarm status OID comprising a low current OID, the alarm status string comprising a plurality of alarm status bits indicating each of the plurality of outlets in a low current state.

Example 18 may include the at least one non-transitory computer-readable medium of Example 2, the plurality of power outlets comprising at least one enrolled outlet, the at least one enrolled outlet comprising an outlet determined to have a previously-connected device.

Example 19 may include the at least one non-transitory computer-readable medium of Example 4, the set of instructions, in response to being executed via the processing unit of the computing device, cause the computing device to determine the at least one enrolled outlet via polling the PDU using a current amperage OID operative to cause the PDU to return an amperage value for the at least one outlet, and defining the at least one outlet as an enrolled outlet responsive to the amperage for the at least one outlet being greater than or equal to an amperage threshold.

Example 20 may include the at least one non-transitory computer-readable medium of Example 1, the set of instructions, in response to being executed via the processing unit of the computing device, cause the computing device to parse the alarm status string for determining each of the plurality of power elements in the active alarm state by converting the alarm status string to an alarm status integer, converting the alarm status integer to an alarm status binary string, and padding the alarm status binary string until an alarm status binary string length equals the number of the plurality of power elements, each of a plurality of bits in the alarm status binary string associated with one of the plurality of power elements.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:

a memory storing instructions; and logic, at least a portion of the logic implemented in circuitry coupled to the memory, the logic, responsive to executing the instructions, to:
receive an alarm status string comprising a plurality of alarm status bits from a power device comprising a plurality of power elements, each one of the plurality of alarm status bits representing one of the plurality of power elements and configured to indicate an active alarm state of the one of the plurality of power elements based on a value of the one of the plurality of alarm status bits, the value of the one of the plurality of alarm status bits comprising a binary value configured to be set to one of a first binary value or a second binary value, wherein:
the first binary value indicates an active alarm state for the one of the plurality of power elements being represented by the one of the plurality of alarm status bits, and
the second binary value indicates a non-active alarm state for the one of the plurality of power elements being represented by the one of the plurality of alarm status bits, and
set each of the plurality of power elements in the active alarm state based on the alarm status string via setting an alarm status associated with one of the plurality of power elements to the active alarm state responsive to a corresponding one of the plurality of alarm status bits having the value of an alarm value.

2. The apparatus of claim 1, the logic, responsive to executing the instructions, to poll the power device using an alarm status identifier, the alarm status identifier comprising an alarm status object identifier (OID) operative to cause the power device to return the alarm status string.

3. The apparatus of claim 1, the logic, responsive to executing the instructions, to parse the alarm status string for determining each of the plurality of power elements in the active alarm state by:
converting the alarm status string to an alarm status integer,
converting the alarm status integer to an alarm status binary string, and
padding the alarm status binary string until an alarm status binary string length equals a number of the plurality of power elements, each of a plurality of bits in the alarm status binary string associated with one of the plurality of power elements.

4. The apparatus of claim 1, the power device comprising a power distribution unit (PDU) and the plurality of power elements comprising a plurality of power outlets of the PDU.

5. The apparatus of claim 4, the plurality of power outlets comprising at least one enrolled outlet, the at least one enrolled outlet comprising an outlet determined to be associated with a previously-connected device.

6. The apparatus of claim 5, the logic, responsive to executing the instructions, to enable active alarming for the at least one enrolled outlet via setting an alarm threshold to a minimum value.

7. The apparatus of claim 1, each of the plurality of alarm status bits configured to indicate that a corresponding one of the plurality of power elements is in a low current state.

8. A computer-implemented method, comprising, via a processor of a computing device:
receiving an alarm status string comprising a plurality of alarm status bits from a power device comprising a plurality of power elements, each one of the plurality of alarm status bits representing one of the plurality of power elements and configured to indicate an active alarm state of the one of the plurality of power elements based on a value of the one of the plurality of alarm status bits, the value of the one of the plurality of alarm status bits comprising a binary value configured to be set to one of a first binary value or a second binary value, wherein:
the first binary value indicates an active alarm state for the one of the plurality of power elements being represented by the one of the plurality of alarm status bits, and
the second binary value indicates a non-active alarm state for the one of the plurality of power elements being represented by the one of the plurality of alarm status bits; and
setting each of the plurality of power elements in the active alarm state based on the alarm status string via setting an alarm status associated with one of the plurality of power elements to the active alarm state responsive to a corresponding one of the plurality of alarm status bits having the value of an alarm value.

9. The computer-implemented method of claim 8, comprising polling the power device using an alarm status identifier, the alarm status identifier comprising an alarm status object identifier (OID) operative to cause the power device to return the alarm status string.

10. The computer-implemented method of claim 8, comprising parsing the alarm status string for determining each of the plurality of power elements in the active alarm state by:
converting the alarm status string to an alarm status integer,
converting the alarm status integer to an alarm status binary string, and
padding the alarm status binary string until an alarm status binary string length equals a number of the plurality of power elements, each of a plurality of bits in the alarm status binary string associated with one of the plurality of power elements.

11. The computer-implemented method of claim 8, the power device comprising a power distribution unit (PDU) and the plurality of power elements comprising a plurality of power outlets of the PDU.

12. The computer-implemented method of claim 11, the plurality of power outlets comprising at least one enrolled outlet, the at least one enrolled outlet comprising an outlet determined to be associated with a previously-connected device.

13. The computer-implemented method of claim 12, comprising enabling active alarming for the at least one enrolled outlet via setting an alarm threshold to a minimum value.

14. The computer-implemented method of claim 8, each of the plurality of alarm status bits configured to indicate that a corresponding one of the plurality of power elements is in a low current state.

15. At least one non-transitory computer-readable medium comprising a set of instructions that, in response to being executed via a processing unit of a computing device, cause the computing device to:
receive an alarm status string comprising a plurality of alarm status bits from a power device comprising a plurality of power elements, each one of the plurality of alarm status bits representing one of the plurality of power elements and configured to indicate an active alarm state of the one of the plurality of power elements based on a value of the one of the plurality of alarm status bits, the value of the one of the plurality of alarm status bits comprising a binary value configured to be set to one of a first binary value or a second binary value, wherein:
the first binary value indicates an active alarm state for the one of the plurality of power elements being represented by the one of the plurality of alarm status bits, and
the second binary value indicates a non-active alarm state for the one of the plurality of power elements being represented by the one of the plurality of alarm status bits; and
set each of the plurality of power elements in the active alarm state based on the alarm status string via setting an alarm status associated with one of the plurality of power elements to the active alarm state responsive to a corresponding one of the plurality of alarm status bits having the value of an alarm value.

16. The at least one non-transitory computer-readable medium of claim 15, the set of instructions, in response to being executed via the processing unit of the computing device, to cause the computing device to poll the power device using an alarm status identifier, the alarm status identifier comprising an alarm status object identifier (OID) operative to cause the power device to return the alarm status string.

17. The at least one non-transitory computer-readable medium of claim 15, the set of instructions, in response to being executed via the processing unit of the computing device, to cause the computing device to parse the alarm status string for determining each of the plurality of power elements in the active alarm state by:
converting the alarm status string to an alarm status integer,
converting the alarm status integer to an alarm status binary string, and
padding the alarm status binary string until an alarm status binary string length equals a number of the plurality of power elements, each of a plurality of bits in the alarm status binary string associated with one of the plurality of power elements.

18. The at least one non-transitory computer-readable medium of claim 15, the power device comprising a power distribution unit (PDU) and the plurality of power elements comprising a plurality of power outlets of the PDU.

19. The at least one non-transitory computer-readable medium of claim 18, the plurality of power outlets comprising at least one enrolled outlet, the at least one enrolled outlet comprising an outlet determined to be associated with a previously-connected device.

20. The at least one non-transitory computer-readable medium of claim 15, each of the plurality of alarm status bits configured to indicate that a corresponding one of the plurality of power elements is in a low current state.

* * * * *